UNITED STATES PATENT OFFICE.

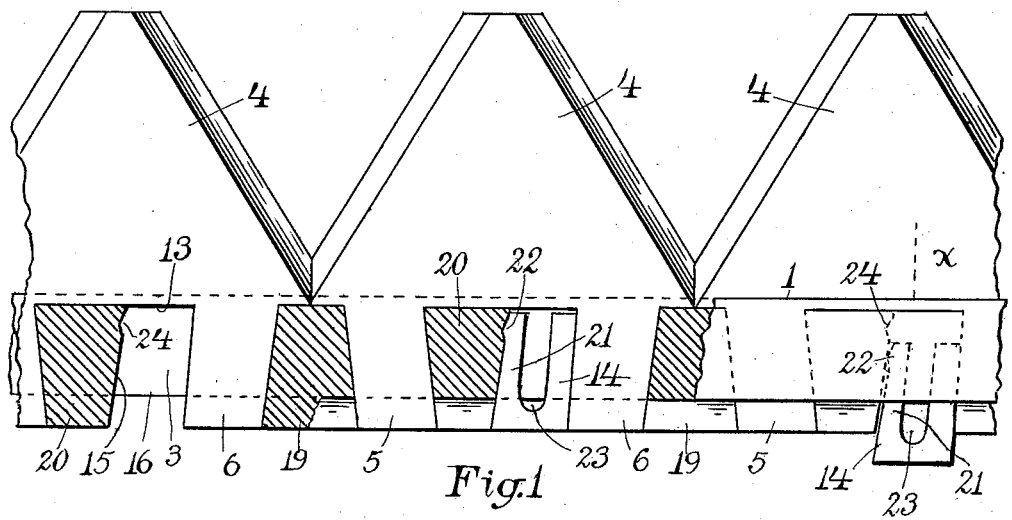

ALFRED D. ABBENZELLER, OF RANDOLPH, MASSACHUSETTS, ASSIGNOR TO UNIVERSAL SICKLE BAR COMPANY, OF BOSTON, MASSACHUSETTS, A CORPORATION OF MASSACHUSETTS.

SICKLE-BAR.

1,319,131.　　　Specification of Letters Patent.　　Patented Oct. 21, 1919.

Application filed November 24, 1917. Serial No. 203,712.

*To all whom it may concern:*

Be it known that I, ALFRED D. ABBENZELLER, a citizen of the United States, and a resident of Randolph, in the county of Norfolk and Commonwealth of Massachusetts, have invented certain new and useful Improvements in Sickle-Bars, of which the following is a full, clear, and exact specification.

In mowing machines, harvesters and other agricultural machines wherein a reciprocating bar is provided with removable cutting blades, it is a most important feature so to attach the blades to the bar as will not only retain them securely in place while the machine is in operation, but which will permit of their ready removal and replacement for sharpening and repairs.

In a companion application, Serial No. 143,315, filed January 29, 1917, is set forth a construction of blade and bar wherein each blade is formed with a dovetailed shank held within a similar but longer slot in the bar by means of a locking plate or wedge. While the same is an efficient arrangement, the present construction is designed to hold the blades with increased firmness and security. To this end, the shank of each blade is bifurcated and each member of this twin-shank given a slot of its own in the bar.

Referring to the drawings forming part of this specification, Figure 1 is a plan view of part of a sickle bar showing a plurality of blades locked therein, portions of the bar being in section. Fig. 2 is a plan view of one of the blades alone. Fig. 3 is a perspective view of a part of the bar with portions cut away and in section. Fig. 4 is a cross section on X—X in Fig. 1. Fig. 5 is a modified form of the locking wedge.

In each figure of the drawings, like numerals refer to like parts, 1 designating the bar formed with slots 2 and 3 extending transversely through it. The slots are in pairs and slightly inclined relative to the longitudinal dimension of the bar, the slots 3 being approximately double the corresponding dimension of the slots 2 measured lengthwise of the bar, although each slot has substantially parallel walls. The two slots 2, 3 which compose a pair are those whose inclined walls would meet if prolonged at a point opposite the blades 4. The shank 5 of each blade is constructed to closely fit the slot 2, but the shank 6 is about half the width of the slot 3. After the shanks of a blade have been inserted within the slots 2, 3, a locking wedge is to be driven into the vacant space of the slot 3.

As shown most clearly in Fig. 2, the shanks 5, 6 in order to fit the slots above described, are inclined to compose a dovetail space 7 between them, and to have their outer edges 9, 10 come approximately into contact with the ends 11 and 12 respectively of the slots 2 and 3, while the edge or base 13 of the blade comes against or within the bar, and the locking wedge 14 fits between the shank 6 and the end 15 of the slot 3.

As shown in Fig. 3, I prefer to have the rear edges of the under part 16 and of the top part 17 of the bar 1 not to project as far as the rear edges of the unslotted parts 19 and 20 of the bar, the latter being made to reach to a line flush with the outer ends of the locking wedges 14 in order to present a smooth, unbroken surface. Otherwise, the same would act as a saw and be in danger of injuring, when the bar is in motion, the hand or leg of a person accidentally coming in contact therewith. The central portion of Fig. 1 shows this unbroken rear of the sickle bar.

This overhang of the locking wedges 14 is provided for the purpose of permitting their removal, which is done by means of a suitable tool adapted to engage the opening 23 in each wedge and to pry the latter out.

For retaining the wedges securely in place against the possibility of accidental removal, I prefer to extend the opening through to the inner end of each wedge, thereby forming two legs capable of resilient movement toward and from each other. The leg 21, which is the one pressed against the bar-portion 20, is made with a slight projection or ear 22 adapted to swing into a corresponding recess 24 in the bar-portion 20. Consequently when the wedges have been forced into place until their ears 22 enter the recesses 24, they cannot come out until a sufficiently powerful extracting tool has been applied to them.

In the modification illustrated in Fig. 5, the opening 23 does not extend entirely through to the inner end of each wedge, and the ear 22 is formed midway of the arch, with the recess 24 located to correspond.

By thus constructing the twin-shanks and locking wedges, the cutting blades are not only fastened securely and firmly, in place, but if a blade does not have its shanks inserted fully into the slots, even lacking a sixteenth of an inch or more of being seated against the bar, the driving of a locking wedge therein will act to draw the shanks solidly into position until the blade base 13 is firmly against the bar.

What I claim is:

1. A sickle bar comprising a bar having transverse slots through it, and cutter blades each having two spaced shanks, the outer ends of the shanks being nearer together than their inner ends, the slots being in pairs for the accommodation of the two shanks of a blade in a pair of the slots, one slot of each pair approximately fitting the shank therein but the other slot being wider than the shank in it, and a locking block filling the space in each wider slot not occupied by the shank therein, each locking block having means for retaining it in place.

2. A sickle bar comprising a bar having transverse slots through it, and cutter blades each having two spaced shanks, each shank having substantially parallel side edges and the two shanks of each blade forming a dove-tail space between them, the slots being in pairs, one slot of a pair fitting approximately one of the shanks of a blade but the other slot being wider than the other shank, and a locking block filling the space in each wider slot not occupied by the shank therein, and means for retaining the locking blocks in place.

3. A sickle bar comprising a bar having transverse slots through it, the metal between the slots being extended beyond the face of the bar, cutter blades having shanks within said slots, one shank of each blade being narrower than the slot receiving it, a locking block filling the space not occupied in the slot by the shank therein, and means for retaining the locking blocks in place, the ends of the shanks and the locking blocks being flush with said extended portions of the bar.

4. A sickle bar comprising a bar having transverse slots through it, cutter blades having shanks in said slots, one shank of each blade being narrower than the slot containing it, and locking blocks filling the spaces in the slots not occupied by a shank therein, each block being apertured to render it yielding laterally, and the yielding portion being formed with a projection for coacting with a part of the structure confining it and thereby retaining it in place.

5. A sickle bar comprising a bar having transverse slots through it, cutter blades having shanks entering said slots, each blade having a shank narrower than the slot containing it, and locking blocks filling the space in each slot not occupied by a shank therein, each block being bifurcated to render it laterally yielding and formed with a projection, and each slot containing a block being formed with a recess receiving said projection and thereby retaining the locking block in place.

In testimony that I claim the foregoing invention, I have hereunto set my hand this 15th day of November, 1917.

ALFRED D. ABBENZELLER.